US009123251B2

(12) United States Patent
Le et al.

(10) Patent No.: US 9,123,251 B2
(45) Date of Patent: Sep. 1, 2015

(54) IMAGE SYSTEM FOR AUTOMOTIVE SAFETY APPLICATIONS (71) Applicant: Ford Global Technologies, LLC, Dearborn, MI (US)

(72) Inventors: Jialiang Le, Canton, MI (US); Manoharprasad K. Rao, Novi, MI (US); Alex Maurice Miller, Canton, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 13/971,474

(22) Filed: Aug. 20, 2013

(65) Prior Publication Data
US 2015/0055120 A1 Feb. 26, 2015

(51) Int. Cl.
*G01C 3/08* (2006.01)
*G08G 1/16* (2006.01)

(52) U.S. Cl.
CPC ............... *G08G 1/165* (2013.01); *G08G 1/166* (2013.01)

(58) Field of Classification Search
CPC ........ G01C 3/08; G01C 15/002; G01S 17/89; G01S 7/4817; G01S 17/42
USPC ........... 356/3.01, 3.09, 4.01, 4.07, 5.01, 5.09, 356/9, 625
See application file for complete search history.

(56) References Cited

U.S. PATENT DOCUMENTS

| | | | |
|---|---|---|---|
| 5,638,164 A * | 6/1997 | Landau | 356/5.01 |
| 5,894,371 A * | 4/1999 | Wrobel et al. | 359/823 |
| 6,028,509 A | 2/2000 | Rice | |
| 6,323,941 B1 * | 11/2001 | Evans et al. | 356/4.01 |
| 6,454,178 B1 | 9/2002 | Fusco et al. | |
| 6,470,278 B1 | 10/2002 | Strumulo et al. | |
| 6,489,889 B1 | 12/2002 | Smith | |
| 6,639,512 B1 | 10/2003 | Lee et al. | |
| 6,737,975 B2 | 5/2004 | Pelletier | |
| 6,922,147 B1 | 7/2005 | Viksnins et al. | |
| 6,922,622 B2 | 7/2005 | Dulin et al. | |
| 7,170,401 B1 | 1/2007 | Cole | |
| 7,218,218 B1 | 5/2007 | Rogers | |
| 7,233,239 B2 | 6/2007 | Chitalia et al. | |
| 7,265,671 B1 | 9/2007 | Valles et al. | |

(Continued)

FOREIGN PATENT DOCUMENTS

| | | |
|---|---|---|
| JP | 11312300 | 9/1999 |
| JP | 2005293376 | 10/2005 |

(Continued)

*Primary Examiner* — Isam Alsomiri
*Assistant Examiner* — Samantha K Abraham
(74) *Attorney, Agent, or Firm* — LeClairRyan (57) ABSTRACT

An improved vision-based system generates object detection corresponding to different viewing areas based on vehicle speed. At lower vehicle speeds, the system covers a wider field of view and a near zone while at higher vehicle speeds the system covers a normal or narrower field of view and a far zone. The system includes a lens package having a movable lens, an image sensor and an image transformer. The movable lens is movable between a first position representing a wide angle view and a second position representing a normal angle view. Each of these views generates an image such that a wide angle view generates a wide angle image and a normal angle view generates a normal angle image. The wide angle view is associated with the vehicle's passive safety systems while the normal angle view is associated with the vehicle's active safety systems.

13 Claims, 5 Drawing Sheets (56) References Cited

U.S. PATENT DOCUMENTS

| | | |
|---|---|---|
| 7,348,880 B2 | 3/2008 | Hules et al. |
| 7,353,088 B2 | 4/2008 | Eagen et al. |
| 7,408,445 B1 | 8/2008 | Cunningham |
| 7,466,217 B1 | 12/2008 | Johnson et al. |
| 7,786,852 B2 | 8/2010 | Kautz |
| 8,284,041 B2 | 10/2012 | Cuddihy et al. |
| 8,284,042 B2 | 10/2012 | Rao et al. |
| 2005/0024188 A1 | 2/2005 | Sider |
| 2005/0068162 A1 | 3/2005 | Santa Cruz et al. |
| 2005/0206510 A1* | 9/2005 | Weber et al. ............ 340/435 |
| 2006/0033613 A1 | 2/2006 | Reece |
| 2007/0285218 A1 | 12/2007 | Fletcher et al. |
| 2010/0007728 A1* | 1/2010 | Strauss et al. ............ 348/118 |
| 2010/0201507 A1 | 8/2010 | Rao et al. |
| 2011/0141321 A1* | 6/2011 | Tang et al. ............ 348/240.99 |
| 2012/0256764 A1* | 10/2012 | Zeng ............ 340/905 |

FOREIGN PATENT DOCUMENTS

| | | |
|---|---|---|
| JP | 2010116036 | 5/2010 |
| TW | 1325383 | 6/2010 |

* cited by examiner

IMAGE SYSTEM FOR AUTOMOTIVE SAFETY APPLICATIONS

TECHNICAL FIELD

The disclosed inventive concept relates generally to vision-based sensing systems for automotive safety applications. More particularly, the disclosed inventive concept relates to a vision sensor coupled to an optical system that generates object detection corresponding to different viewing areas based on vehicle speed and is thus capable of sensing both a wide field of view at a near zone and a narrow field of view at a far zone.

BACKGROUND OF THE INVENTION

Many modern vehicles include rudimentary collision avoidance systems of some type. Some vehicles include more sophisticated systems such as adaptive cruise control and forward collision warning.

While many such systems are sensor-based and rely upon, for example, radar, light detection and ranging systems, infrared range finders, sound navigation and the like, more recently the use of vision-based sensing systems for automotive safety applications has grown in popularity because of their greater image generation accuracy.

Regardless of the sensor arrangement employed, today's sensing systems for safety applications face a common challenge, which is to combine both active and passive applications into a single safety system. Active safety systems are designed for applications such as adaptive cruise control, forward collision warning, lane keeping aids and the like, and thus require far distance coverage (for distances up to about 160 meters) with a relatively narrow field of view. Conversely, passive safety systems are designed for sensing objects more local to the vehicle, such as pedestrians. Passive safety systems thus require near distance coverage (for distances up to about 30 meters) with a relatively wide field of view.

It would thus be advantageous if a single vision-based sensing system was available that can be used for both active and passive safety applications and which can accommodate different distance and field of coverage requirements. Such a system would overcome the problems realized today by vehicle designers and manufacturers. Therefore, there is a need in the art for such a system.

SUMMARY OF THE INVENTION

The disclosed inventive concept overcomes the problems associated with known vision-based vehicle safety systems. Particularly, the disclosed inventive concept relates to an improved vision-based system that generates object detection corresponding to different viewing areas based on vehicle speed. In addition to vehicle speed other inputs relied upon to determine field of view change might include vehicle yaw rate, longitudinal acceleration, digital mapping and the like.

At lower vehicle speeds the vision-based system of the disclosed inventive concept preferably covers a wider field of view and a near zone while at higher vehicle speeds the system preferably covers a normal or narrower field of view and a far zone. A controller is coupled to the vision sensor to generate safety system signals for both passive and active safety systems.

The vision-based system of the disclosed inventive concept includes a lens package that includes a movable lens, an image sensor and an image transformer. The movable lens of the lens package is movable between a first position representing a wide angle view and a second position representing a normal angle view. Each of these views generates an image, that is, a wide angle view generates a wide angle image and a normal angle view generates a normal angle image. The wide angle view is associated with the vehicle's passive safety system while the normal angle view is associated with the vehicle's active safety system.

The system further includes an image sensor for receiving the wide angle and normal angle images and an image transformer for transforming the objects of the images to either a wide angle view or a normal view.

The vision-based system of the disclosed inventive concept further includes a control module operatively associated with the lens package, the image sensor, the image transformer and the vehicle. Inputs are connected to the control module, such inputs including but not being limited to a speed sensor, a yaw rate sensor, and a longitudinal acceleration sensor. Other inputs might provide the control module with information regarding the range, velocity and azimuth angle of an object captured by the lens package.

The operating protocol associated with the vision-based system of the disclosed inventive concept includes the basic steps of defining a threshold for vehicle speed, determining the vehicle speed, determining the position of the movable lens relative to the other fixed lens of the lens package, moving the movable lens to a wide angle position (if needed) if it is determined that the vehicle speed is below the threshold and moving the movable lens to a normal angle position (if needed) if it is determined that the vehicle speed is above the speed threshold. A wide angle image of an object or a normal angle image of an object is generated. The object in the image is transformed to either a wide angle view or to a normal angle of view as needed.

Thereafter the range, velocity and azimuth angle of the captured object are estimated. Once these parameters are estimated, the captured object is classified, identified and tracked. The detection confidence level of the captured object is then estimated. Finally, the gathered and interpreted information is broadcast to the vehicle.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

In general, the disclosed invention provides an image system for use with an automotive vehicle that includes a vision sensor coupled with an optical arrangement in which the lens positions can be changed. The sensor generates object detection corresponding to different viewing areas based on vehicle speed and, optionally, such variables as vehicle yaw rate, longitudinal acceleration, digital mapping and the like.

Figure 1:
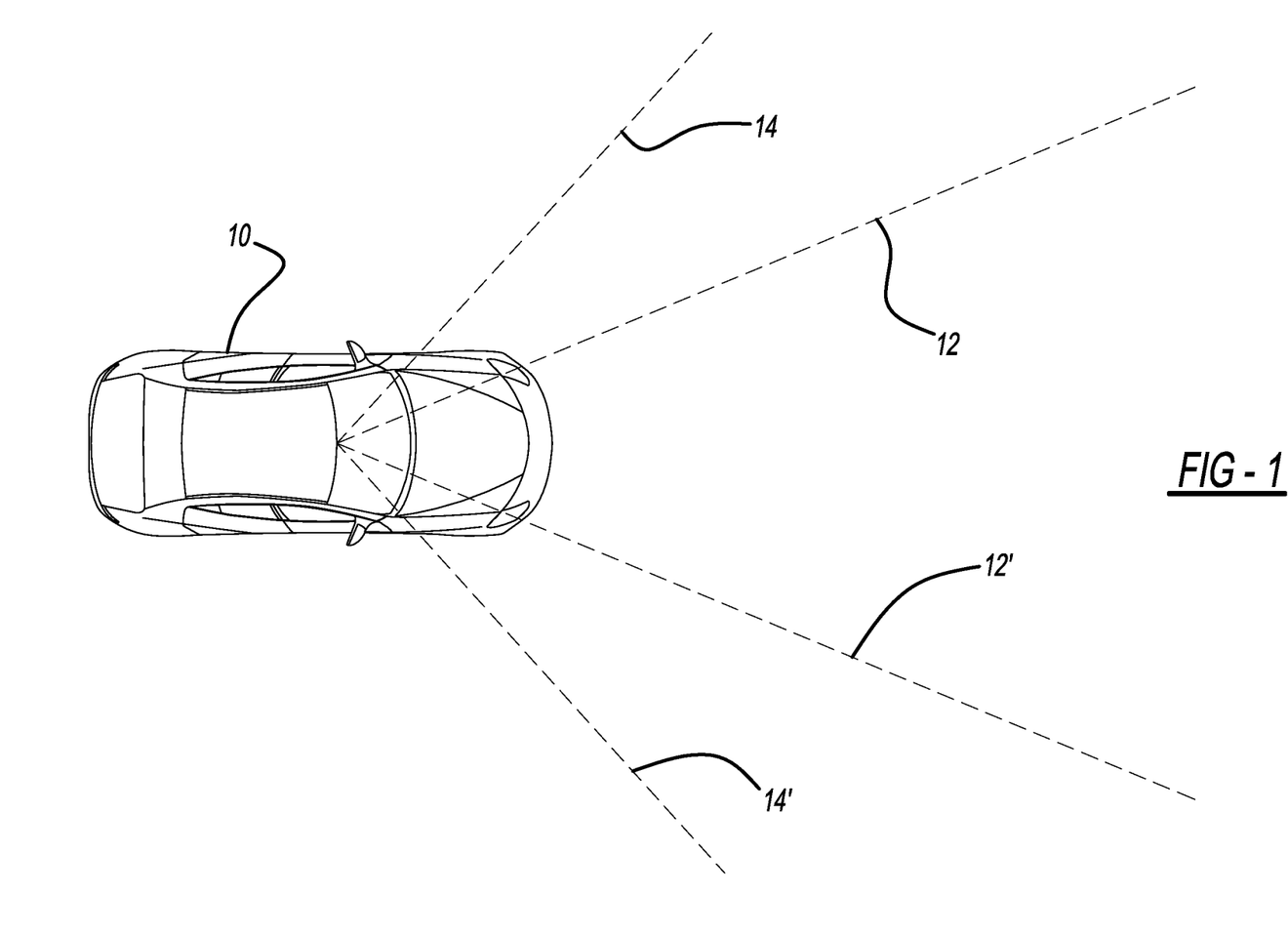
FIG. 1 is a schematic representation of an automobile vehicle showing a normal field of view for active safety systems and a wide field of view for passive safety systems.

FIG. 1 illustrates a schematic representation of an automobile vehicle 10 that incorporates the image system of the disclosed inventive concept. Two fields of view are diagrammatically shown. These fields include a normal field of view for active safety defined by broken lines 12 and 12' and a wide field of view for passive safety (particularly for pedestrian protection) defined by broken lines 14 and 14'. The fields of view and the broken lines that define them are shown for illustrative purposes only as they are suggestive and are not intended as being limiting.

The narrow or normal field of view for active safety applications is appropriate for active safety applications, such as "adaptive cruise control," "forward collision warning," "lane keeping aid" and the like. The normal field of view is not only narrower but is longer (about 160 meters) than that required for passive safety applications (about 30 meters). Due to pixel and resolution constraints at the vision sensor (discussed below), a narrower field of view may be advantageous for active safety applications.

Figure 2:
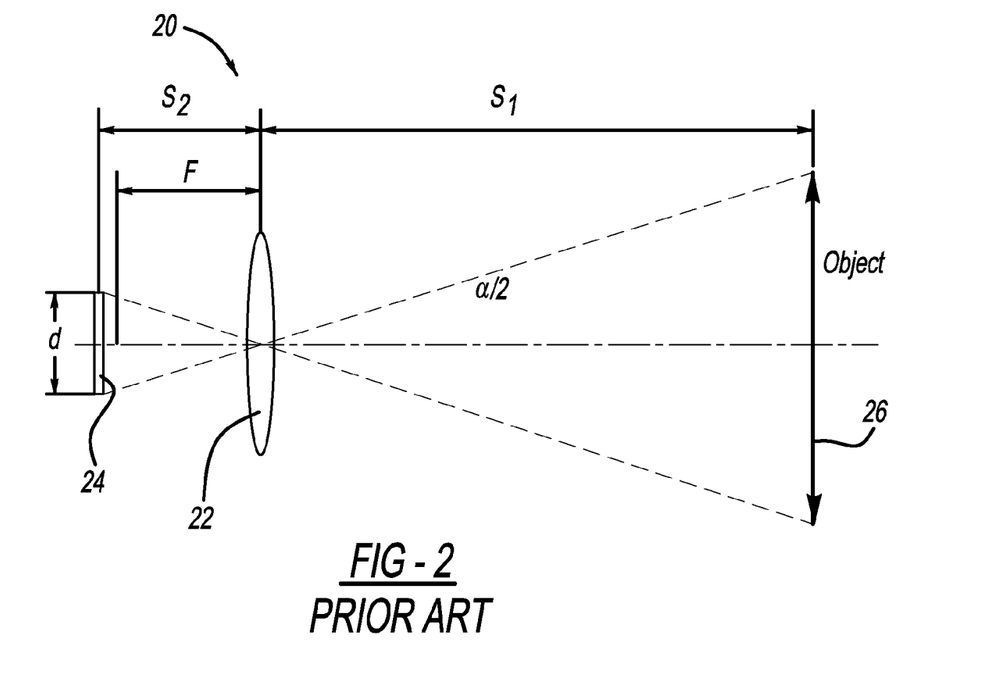
FIG. 2 is a diagrammatic representation of a conventional lens in its normal position.
Figure 3:
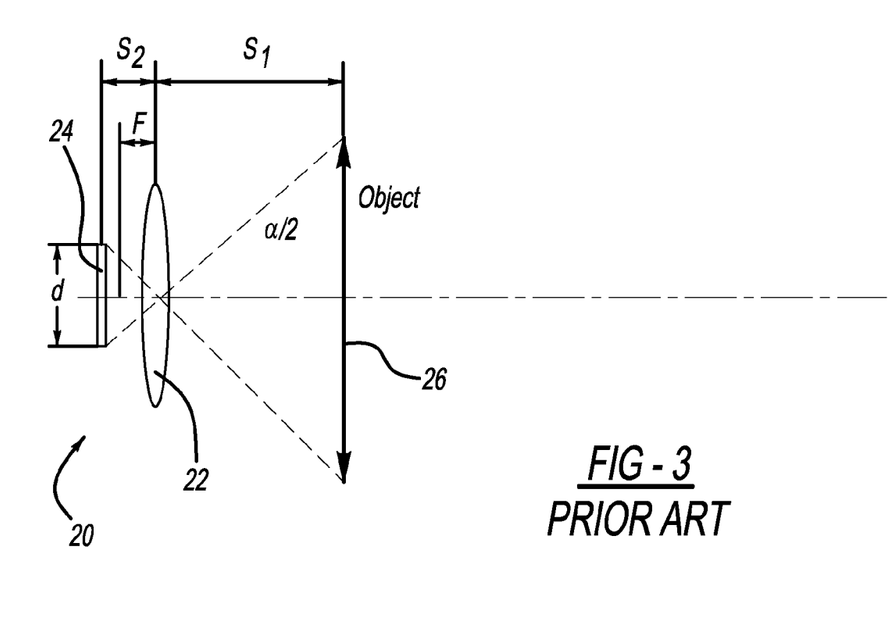
FIG. 3 is a diagrammatic representation of the conventional lens of FIG. 2 in its wide angle position.

FIGS. 2 and 3 are diagrammatic representations of known lens systems illustrating lenses in different positions. For both FIGS. 2 and 3, the following may be used:

| | |
|---|---|
| $S_1$ | Distance between the lens and the object |
| $S_2$ | Image plane distance |
| F | Focal length |
| $\alpha$ | Angle of view |
| d | Sensor dimension |

Particularly, FIG. 2 is a diagrammatic representation of a lens system 20 in which a conventional lens 22 is in its normal position. An image-receiving sensor 24 is adjustably positioned at a specified focal length F from the conventional lens 22. This arrangement is suitable for viewing a distant object such as a vehicle. As is illustrated in FIG. 2, when the lens 22 is further from the sensor 24, the image plane formed on the sensor 24 is further away from the lens 22.

FIG. 3 is a diagrammatic representation of the lens system 20 in which the lens 22 has been relocated closer to the image-receiving sensor 24 to its wide angle position. The image-receiving sensor 24 is fixed thus the focal length F has been reduced. This arrangement is suitable for viewing a nearby object such as a pedestrian. As is illustrated in FIG. 3, when the lens 22 is in a position closer to the sensor 24 the image plane formed on the sensor 24 is closer to the lens 22. The position of the lens 22 relative to the fixed image-receiving sensor 24 (and thus the focal length) may be changed by a motor and the like.

Figure 4:
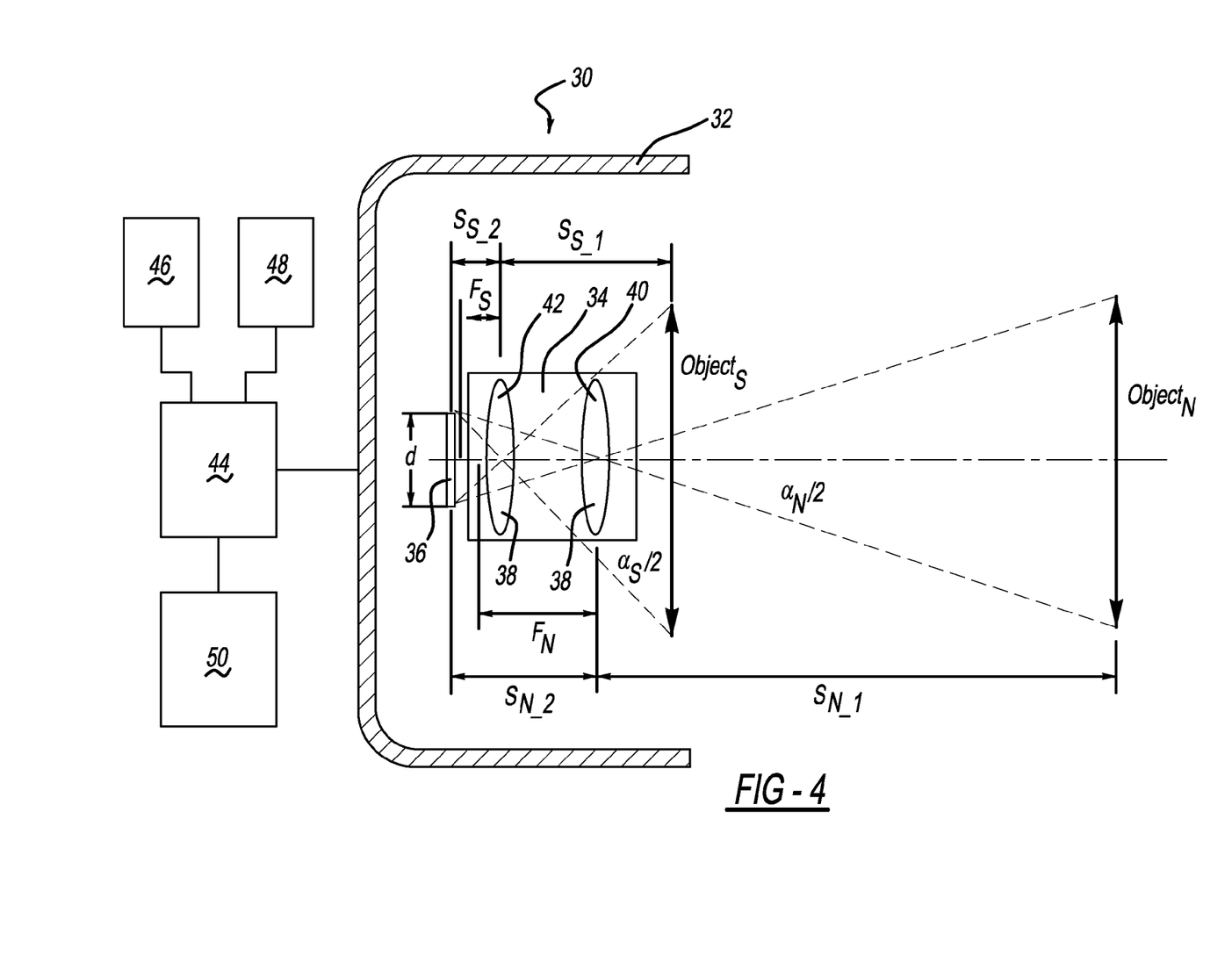
FIG. 4 is a diagrammatic representation of a lens package for a dual field of view according to the disclosed inventive concept shown in its normal position.
Figure 5:
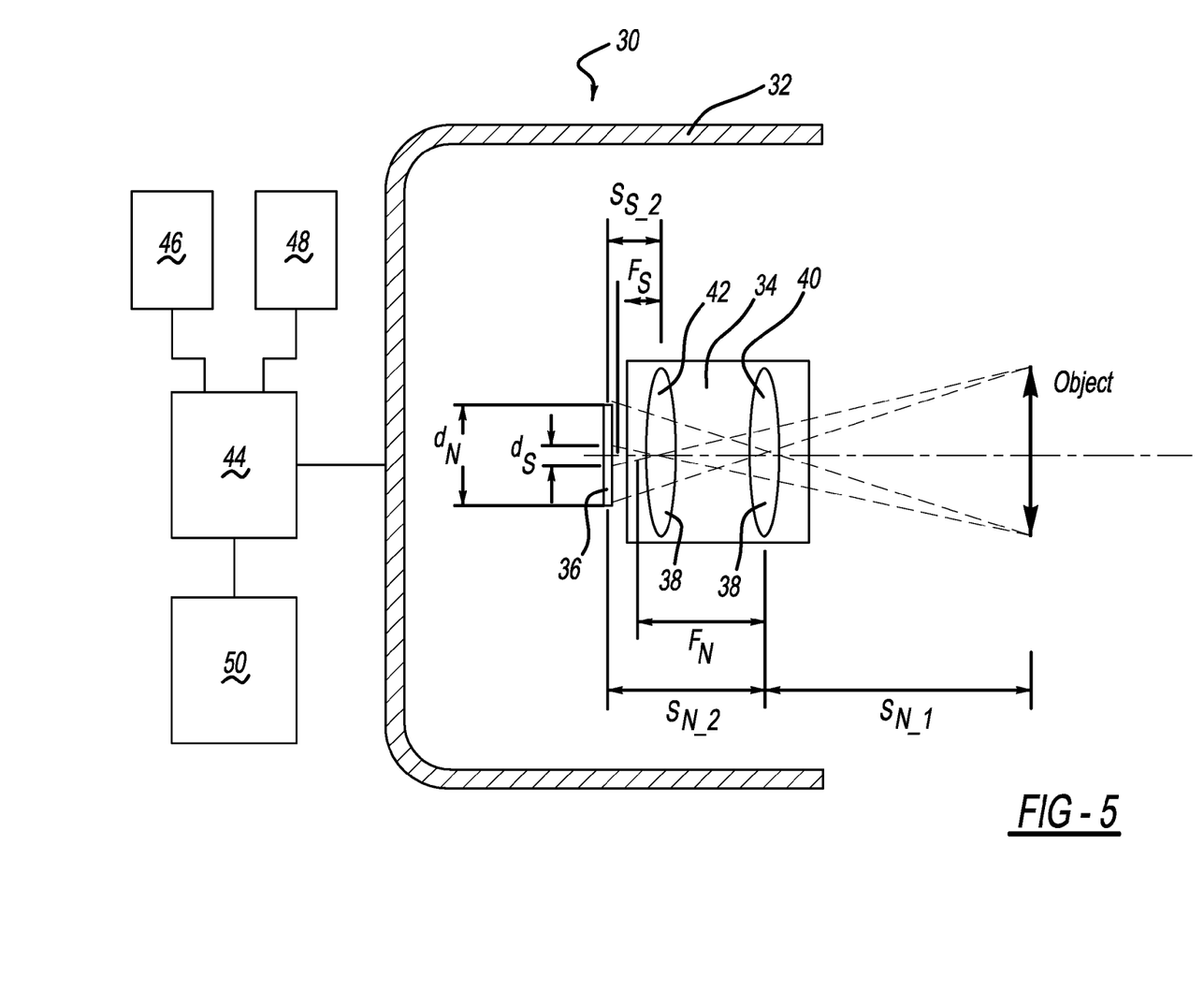
FIG. 5 is a diagrammatic representation of the lens package for a dual field of view of FIG. 4 shown in its wide angle position.

FIGS. 4 and 5 illustrate a dual field of view image system for automotive applications. The image system, generally illustrated as 30, includes a housing 32. Within the housing 32 is positioned a lens package 34 and an image sensor 36. The lens package 34 consists of a fixed lens (not shown) and a movable lens 38. The movable lens 38 can be adjusted to one of two positions, a normal field of view position 40 and a wide angle field of view position 42. Movement of the movable lens 38 is effected by a motor for mechanical adjustment or by another mechanical device (not shown).

The image system 30 is attached to a system control module 44 that is, in turn, attached to the vehicle's operating system. The control module 44 includes a feature for transforming objects received by the image sensor 36 reversibly between a wide angle view and a normal angle view.

As shown in FIG. 5, in the normal field of view position 40 the received image fills a larger amount of the image sensor 36 while in the wide angle field of view position 42 the received image fills smaller portion of the screen. Thus image transformation is necessary due to the changes in pixel position between the normal angle view and the wide angle view. Transformation can be achieved by hardware associated with the control module 44 having an appropriate algorithm or by an algorithm programmed into the control module 44.

The control module 44 receives various inputs from the vehicle 10. These inputs include a vehicle speed sensor 46 that signals vehicle speed to the control module 44. Additional sensors might be added as needed and might include a vehicle yaw rate sensor 48 and a vehicle longitudinal acceleration sensor 50. The vehicle yaw rate sensor 48 and the vehicle longitudinal acceleration sensor 50 both provide information as to vehicle operating parameters to the control module 44 which regulates the position of the movable lens 38 relative to the fixed lens.

The position of the movable lens 38 shown in FIG. 4 is set at a normal field of view position 40, for example, at 42 degrees. This is the position the movable lens 38 would have during vehicle speeds greater than a certain threshold, such as 48 kph, for active safety applications. This arrangement makes it possible to achieve better coverage for active safety applications, particularly when the object is far away, for example, between about 50 m and 200 m away. In this position the image that appears on the image sensor 36 provides coverage for a narrower field of view.

If the vehicle speed falls below the specified threshold, again, for example, 48 kph, the lens is moved to its wide angle field of view position 42 as shown in FIG. 5 for passive safety applications. In this position wide fields of view of, for example, 100 degrees and above are attainable. As a consequence the size of the object image that appears larger in the normal position (dN) is transformed to appear relatively small ($d_s$) on the image sensor 36.

Because the relatively small image that is created when the image system 30 is in its wide angle position, the image size needs to be transformed to allow for proper image tracking by the image sensor 36. Transformation of the image size into a smaller size occurs based on the following suggested conversion ratio:

$$\text{ratio} = \frac{d_S}{d_N} = \frac{f_S}{f_N} \cdot \frac{S_{N\_1}}{S_{N\_1} + f_N - f_S}$$

Other conversion ratios may be possible.

In general, while the vehicle 10 is above a threshold speed its image system 30 operates in an active safety mode whereby the movable lens 38 is positioned for far distance coverage. When the speed of the vehicle 10 falls below the threshold speed the movable lens 38 is repositioned for wide angle coverage. Other inputs may be relied upon. Such other inputs may include yaw rate, longitudinal acceleration and digital mapping may be used by the control module 44 to position the movable lens 38. The object information must be transformed between the near zone and far zone lens positions of the movable lens 38 whenever the movable lens position changes.

Figure 6:
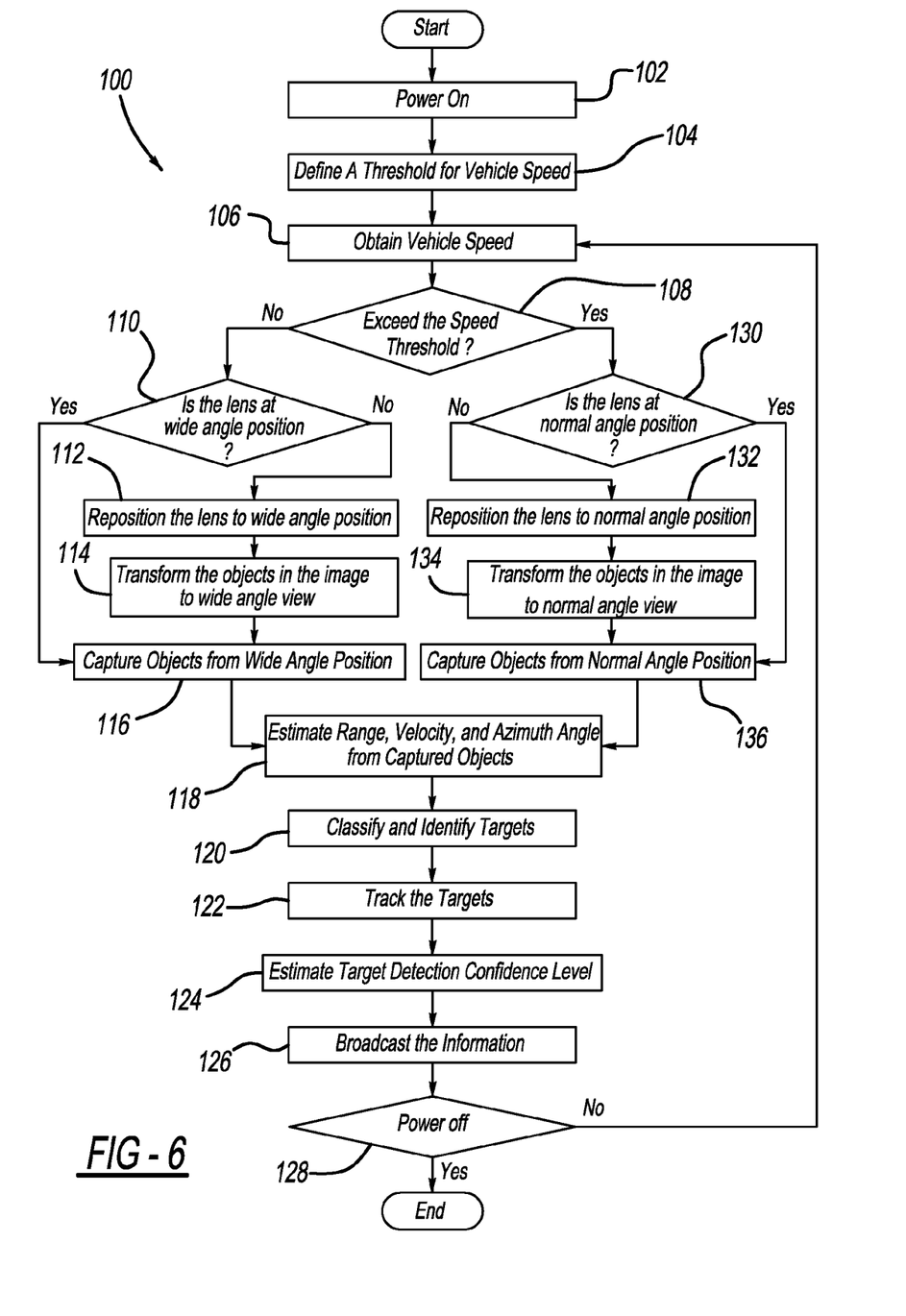
FIG. 6 depicts a logic flow diagram of the operation of an image system of the disclosed inventive concept using the lens package of FIGS. 4 and 5.

FIG. 6 depicts a logic flow diagram 100 for the operating protocol of an image system 30 of the disclosed inventive concept using the image system 30 incorporated into the vehicle 10. In step 102, the power to the image system 30 is switched to "on." In step 104, the threshold speed of the vehicle 10 is defined. The threshold speed may be selected from a range of speeds appropriate to the vehicle and other parameters.

In step 106, the vehicle speed is obtained by the control module 44 from the vehicle speed sensor 46. In step 108, the query is made whether or not the vehicle speed exceeds the vehicle speed threshold defined at step 104. If the response to the inquiry at step 108 is "no," then at step 110 the inquiry is made whether or not the position of the movable lens 38 is set to its wide angle position. If the response to the inquiry at step 110 is "no," then the movable lens 38 is repositioned to its wide angle position at step 112.

Thereafter, at step 114, the objects in the image produced in the image system are transformed to a wide angle view followed by step 116 in which the objects from the wide angle position are captured.

If the response to the inquiry at step 110 is "yes," then the next step is also to capture the objects from the wide angle position at step 116.

Once the objects are captured at step 116, the range, velocity and azimuth angle of the vehicle 10 relative to the captured objects are estimated at step 118. After the range, velocity and azimuth angle are estimated at step 118, the observed targets are classified and identified by the control module 44 at step 120.

The classified and identified targets are thereafter tracked in step 122. Classification is based upon pre-selected values. Once classified and tracked, the confidence level of target detection is estimated in step 124. Target detection confidence is based on a pre-selected range of target identification models. Following estimation of target detection confidence the information is broadcast to relevant vehicle systems in step 126.

If, in step 108, the response to the query whether or not the vehicle speed exceeds the vehicle speed threshold defined at step 104 is "yes," then at step 130 the inquiry is made whether or not the position of the movable lens 38 is set to its normal angle position. If the response to the inquiry at step 130 is "no," then the movable lens 38 is repositioned to its normal angle position at step 132.

Thereafter, at step 134, the objects in the image produced in the image system are transformed to a normal angle view. This is followed by step 136 in which the objects from the normal angle position are captured.

If the response to the inquiry at step 130 is "yes," then the next step is also to capture the objects from the normal angle position at step 136.

Once the normal angle objects are captured at step 136, the range, velocity and azimuth angle of the vehicle 10 relative to the captured objects are estimated at step 118. After the range, velocity and azimuth angle are estimated at step 118, the observed targets are classified and identified by the control module 44 at step 120.

The classified and identified targets are thereafter tracked in step 122. Once classified and tracked, the confidence level of target detection is estimated in step 124. Target detection confidence is based on a pre-selected range of target identification models. Following estimation of target detection confidence, the information is broadcast to relevant vehicle systems in step 126.

Regardless if, in step 108, the speed threshold is exceeded or not, once the information from step 124 is broadcast at step 126, the power may be turned off at step 128 in which case the protocol is at an end. However, if the power is not turned off, the vehicle speed is again obtained at step 106 to be followed by the steps of the protocol set forth above.

The disclosed invention as set forth above overcomes the challenges faced by known active and passive safety systems for vehicles. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vision-based system for automotive safety applications comprising:
    a lens package including a movable lens, said movable lens being movable between a first position representing a wide angle view and a second position representing a normal angle view, said lens package generating a wide angle image and a normal angle image, said wide angle image having a size and said normal angle image having a size, said sizes being different;
    an image sensor for receiving said images; and
    a transformer for reversibly transforming said size of said wide angle image to said size of said normal angle image and said size of said normal angle image to said size of said wide angle image.

2. The vision-based system for automotive safety applications of claim 1 wherein said vehicle includes both passive and active safety systems, and where said wide angle image is associated with said passive safety systems and said normal angle image is associated with said active safety systems.

3. The vision-based system for automotive safety applications of claim 1 including a control module operatively associated with said lens package, said image sensor and said transformer.

4. The vision-based system for automotive safety applications of claim 3 further including inputs connected to said control module and wherein said inputs are selected from the group consisting of a speed sensor, a yaw rate sensor, and a longitudinal acceleration sensor.

5. A method for passive and active safety applications for a vehicle comprising the steps of:
    forming a vision-based system that includes a movable lens;
    determining a vehicle speed;
    determining the position of said movable lens;
    moving said movable lens to a wide angle position if needed when said speed is below a pre-determined threshold;
    generating a wide angle image having a size;
    moving said movable lens to a normal angle position if needed when said speed is above said pre-determined threshold;
    generating a normal angle image having a size that is different from said size of said wide angle image; and reversibly transforming said size of said wide angle image to said size of said normal angle image and said size of said normal angle image to said size of said wide angle image.

6. The method for passive and active safety applications for a vehicle of claim 5 comprising the steps of generating a wide angle image of an object or a normal angle image object and transforming said generated image.

7. The method for passive and active safety applications for a vehicle of claim 5 comprising the step of capturing the object and estimating the range, velocity and azimuth angle of said captured object.

8. The method for passive and active safety applications for a vehicle of claim 5 comprising the steps of classifying, identifying and tracking said captured object.

9. The method for passive and active safety applications for a vehicle of claim 5 comprising the steps of estimating the detection confidence level of said captured object and broadcasting the information gathered and interpreted regarding the captured object.

10. A vision-based system for automotive safety applications comprising:
a lens package including a lens movable between a wide angle view position and a normal angle view position, said package generating a wide angle image having a size and a normal angle image having a size, said sizes being different;
an image sensor for receiving said images;
a transformer for reversibly transforming said wide angle image size to said normal angle image size and back again.

11. The vision-based system for automotive safety applications of claim 10 wherein said vehicle includes both passive and active safety systems, and where said wide angle image is associated with said passive safety systems and said normal angle image is associated with said active safety systems.

12. The vision-based system for automotive safety applications of claim 10 including a control module operatively associated with said lens package, said image sensor and said transformer.

13. The vision-based system for automotive safety applications of claim 12 further including inputs connected to said control module and wherein said inputs are selected from the group consisting of a speed sensor, a yaw rate sensor, and a longitudinal acceleration sensor.

* * * * *